(12) United States Patent
Sakamoto

(10) Patent No.: US 12,249,870 B2
(45) Date of Patent: Mar. 11, 2025

(54) MOTOR WITH LIQUID COOLED STATOR CORE

(71) Applicant: TOYOTA JIDOSHA KABUSHIKI KAISHA, Toyota (JP)

(72) Inventor: Hironobu Sakamoto, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 220 days.

(21) Appl. No.: 17/925,970

(22) PCT Filed: Jun. 1, 2021

(86) PCT No.: PCT/JP2021/020887
§ 371 (c)(1),
(2) Date: Nov. 17, 2022

(87) PCT Pub. No.: WO2021/246411
PCT Pub. Date: Dec. 9, 2021

(65) Prior Publication Data
US 2023/0208218 A1 Jun. 29, 2023

(30) Foreign Application Priority Data
Jun. 3, 2020 (JP) .................. 2020-096922

(51) Int. Cl.
*H02K 1/20* (2006.01)
*H02K 1/16* (2006.01)
*H02K 9/19* (2006.01)

(52) U.S. Cl.
CPC ................. *H02K 1/20* (2013.01); *H02K 1/16* (2013.01); *H02K 9/19* (2013.01)

(58) Field of Classification Search
CPC ... H02K 1/20; H02K 1/16; H02K 5/203; H02K 5/20; H02K 9/19; H02K 9/193; H02K 9/197; H02K 9/20
USPC .............................. 310/54, 58, 59
See application file for complete search history.

(56) References Cited

U.S. PATENT DOCUMENTS

| | | | |
|---|---|---|---|
| 5,491,371 A * | 2/1996 | Ooi ........................ | H02K 1/32 310/58 |
| 2008/0100159 A1* | 5/2008 | Dawsey ................ | H02K 1/20 310/59 |
| 2008/0174190 A1* | 7/2008 | Kurata .................. | B60L 50/51 310/54 |

(Continued)

FOREIGN PATENT DOCUMENTS

| | | |
|---|---|---|
| JP | 2019-030098 A | 2/2019 |
| JP | 2019-080416 A | 5/2019 |

*Primary Examiner* — Michael Andrews
(74) *Attorney, Agent, or Firm* — Oliff PLC

(57) ABSTRACT

A motor includes a rotor, a stator core, a stator coil, and a shower pipe. An upper part of an outer circumferential surface of the stator core includes a circumferential groove that extends in a circumferential direction of the stator core. Axial grooves are located at positions that are spaced apart from each other in the circumferential direction, and extend in a direction that intersects the circumferential groove. The axial grooves each open in opposite end faces of the stator core in an axial direction of the rotary shaft. Each axial groove includes opposite ends in the axial direction. The opposite ends have a groove width that becomes narrower as the opposite ends become farther from the circumferential groove.

10 Claims, 3 Drawing Sheets

(56) References Cited

U.S. PATENT DOCUMENTS

| | | | |
|---|---|---|---|
| 2012/0080964 A1* | 4/2012 | Bradfield | H02K 1/20 310/58 |
| 2021/0119501 A1* | 4/2021 | Yang | H02K 5/20 |
| 2022/0006354 A1* | 1/2022 | Wang | H02K 7/116 |

* cited by examiner

MOTOR WITH LIQUID COOLED STATOR CORE

TECHNICAL FIELD

The present disclosure relates to a motor that is cooled by a liquid refrigerant supplied from a shower pipe.

BACKGROUND ART

Motors mounted in electric vehicles (e.g., hybrid electric automobiles and battery electric automobiles) have an increased temperature when the motors are used. Thus, the motors are cooled by a cooling mechanism. Examples of the cooling mechanism include a mechanism in which a shower pipe is disposed above the stator of a motor. In this mechanism, a liquid refrigerant (e.g., cooling oil) is supplied from the shower pipe to an upper portion of the outer circumferential surface of the stator core. In the motor, the refrigerant flows downward to cool the stator coil.

Patent Literature 1 discloses an example of a motor with the above cooling mechanism. This motor includes a stator cuff support on an end face of the stator core in a direction (axial direction) corresponding to the axis of the rotary shaft of the motor. Ribs radially protrude outward from the stator cuff support from the end face in the axial direction of the stator cuff support. Each rib includes a distal portion that axially extends on the outer circumferential surface of the stator core. Thus, a refrigerant flowing on the outer circumferential surface of the stator core is guided toward a coil end of the stator coil by the ribs. The refrigerant cools the stator coil in a favorable manner.

CITATION LIST

Patent Literature

Patent Literature 1: Japanese Laid-Open Patent Publication No. 2019-30098

SUMMARY OF INVENTION

Technical Problem

In the conventional motor disclosed in Patent Literature 1, the refrigerant supplied to an upper part of the outer circumferential surface of the stator core all may flow from the outer circumferential surface. Thus, if the refrigerant all flows down from the outer circumferential surface in this manner in a case where, for example, the vehicle is stopped to stop the supply of the refrigerant from the shower pipe, the cooling performance decreases.

It is an objective of the present disclosure to improve the cooling performance when the supply of a refrigerant from a shower pipe is stopped.

Solution to Problem

A motor according to an aspect of the present disclosure includes a rotary shaft, a rotor that rotates with the rotary shaft, a stator core located around the rotor, the stator core including opposite end faces in an axial direction of the rotary shaft, a stator coil located on an inner circumferential portion of the stator core, and a shower pipe located above the stator core, the shower pipe supplying a liquid refrigerant to an upper part of an outer circumferential surface of the stator core. The upper part of the outer circumferential surface of the stator core includes a circumferential groove and axial grooves. The circumferential groove extends in a circumferential direction of the stator core. The axial grooves are located at positions that are spaced apart from each other in the circumferential direction, and extend in a direction that intersects the circumferential groove. The axial grooves each open in the opposite end faces of the stator core. Each of the axial grooves includes opposite ends in the axial direction, the opposite ends having a groove width that becomes narrower as the opposite ends become farther from the circumferential groove.

A motor according to another aspect of the present disclosure includes a rotary shaft, a rotor that rotates with the rotary shaft, a stator core located around the rotor, a stator coil located on an inner circumferential portion of the stator core, and a shower pipe located above the stator core, the shower pipe supplying a liquid refrigerant to an upper part of an outer circumferential surface of the stator core. The stator core includes a first end face and a second end face that are respectively located on opposite sides of the stator core in an axial direction of the rotary shaft. The upper part of the outer circumferential surface of the stator core includes an axial groove through which the refrigerant flows. The axial groove includes a downstream end in a flow direction of the refrigerant, the downstream end opening in at least one of the first end face and the second end face. Part of the axial groove includes a small cross-sectional area portion that has a smaller cross-sectional area than other portions of the axial groove.

DESCRIPTION OF EMBODIMENTS

An embodiment of a motor mounted in an electric vehicle (e.g., hybrid electric automobile and battery electric automobile) will now be described with reference to FIGS. 1 to 3B.

Figure 1:
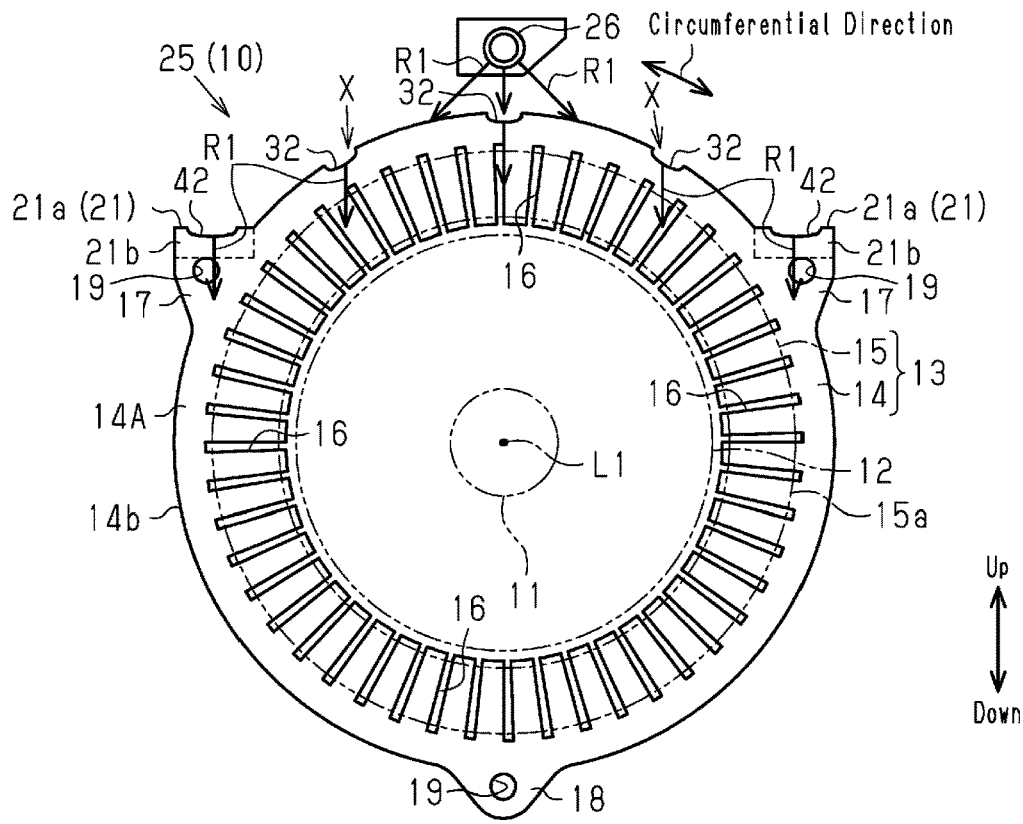
FIG. 1 is a schematic side view of a motor according to an embodiment, showing a stator and a cooling mechanism.

As shown in FIG. 1, a motor 10 includes a rotor 12 and a stator 13. The motor 10 includes a casing (not shown) that rotationally supports a rotary shaft 11. The rotor 12 is coupled to the rotary shaft 11 such that they are integrally rotatable. The rotor 12 is formed by embedding permanent magnets in a rotor core that is formed by stacking substantially annular plates. The plates of the rotor core are each formed into a substantially annular plate by punching an electrical steel sheet, which is a magnetic material (e.g., iron).

The stator 13 includes a stator core 14 and a stator coil 15. The stator coil 15 is located on an inner circumferential portion of the stator core 14. The stator core 14 is cylindrical and is located around the rotor 12. The stator core 14 is formed by punching electrical steel sheets into predetermined shapes and stacking these sheets.

The stator core 14 includes grooves (slots 16) having a narrow groove width. Each slot 16 radially extends outward from the inner circumferential surface of the stator core 14. Adjacent ones of the slots 16 are spaced apart from each other in the circumferential direction of the stator core 14. Each slot 16 extends in a direction corresponding to an axis L1 of the rotary shaft 11 (hereinafter referred to as the "axial direction").

A conducting wire (not shown) is wound around each slot 16 to form one or more stator coils 15. Examples of the conducting wire include different types of wire, such as a rectangular wire, a round wire, and a stranded wire. The stator coil 15 may be formed by sequentially winding long conducting wires or may be formed by connecting short conducting wires (segment coils) to each other.

Figure 2:
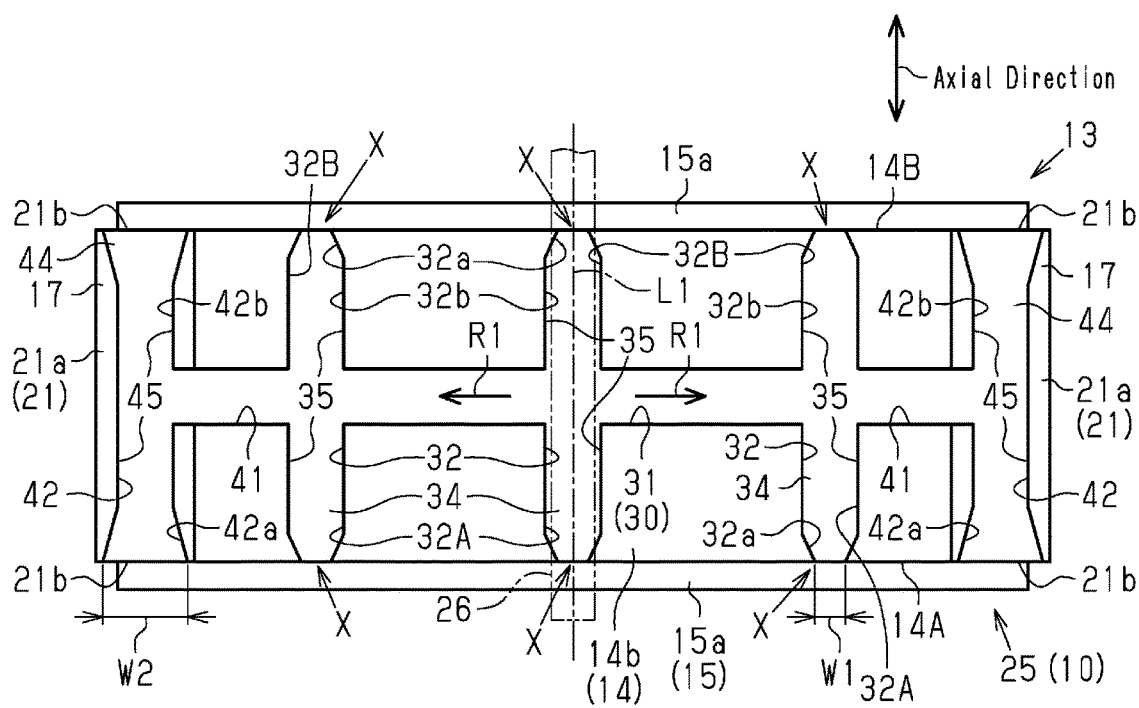
FIG. 2 is a schematic plan view of the stator and the cooling mechanism in the embodiment.

FIG. 2 shows a state where the motor 10 is seen from above. As shown in FIGS. 1 and 2, the stator core 14 includes a first end face 14A and a second end face 14B that are respectively located on the opposite sides of the stator core in the axial direction.

Part of the stator coil 15 protrudes from the first end face 14A and the second end face 14B of the stator core 14. The protruding portions of the stator coil 15 form coil ends 15a on the opposite sides of the stator coil 15 in the axial direction.

On an outer circumferential surface 14b of the stator core 14, protrusions 17, 18 are arranged at multiple (three in the present embodiment) positions that are separated from each other in the circumferential direction). The protrusions 17, 18 each include a bolt hole 19. The protrusions 17, 18 are each formed by punching an electrical steel sheet. The protrusions 17, 18 are used as attachment portions to couple the motor 10 to a vehicle.

One protrusion 18 of the three protrusions 17, 18 is located below the rotary shaft 11. The remaining two protrusions 17 are located at the opposite ends of the upper section of the stator core 14 in the circumferential direction of the stator core 14.

The upper parts of the two protrusions 17 each include a base 21 that extends in the axial direction. Each base 21 includes a flat upper surface 21a. In the present embodiment, the upper surfaces 21a are horizontal.

The stator core 14 may be formed using a compressed powder magnetic body that is formed by compressing magnetic powders with a mold. The stator core 14 may be formed by, for example, combining divided core pieces that are divided in the circumferential direction.

The motor 10 is mounted in a vehicle such that the rotary shaft 11 is horizontal or substantially horizontal. The motor 10 includes a cooling mechanism 25 that circulates a liquid refrigerant R1 to cool the components of the motor 10, including the stator coil 15 and the stator core 14. Examples of the liquid refrigerant R1 include cooling oil.

The cooling mechanism 25 includes a shower pipe 26 that supplies the refrigerant R1 to an upper part of the outer circumferential surface 14b of the stator core 14. In a state of extending in the axial direction, the shower pipe 26 is located above the top of the outer circumferential surface 14b and coupled to the casing of the motor 10. In the present embodiment, the shower pipe 26 is arranged parallel to the axis L1 of the rotary shaft 11. Instead, the shower pipe 26 may be inclined with respect to the axis L1.

A pump (not shown) is connected to the shower pipe 26 by a refrigerant supplying passage (not shown). The refrigerant R1 drawn by the pump is supplied to the shower pipe 26 through the refrigerant supplying passage. The shower pipe 26 includes jet holes (not shown) that jet out the refrigerant R1 toward the lower side or toward the diagonally lower side.

The cooling mechanism 25 further includes a refrigerant passage 30 through which the refrigerant R1 flows. The refrigerant passage 30 includes one circumferential groove 31, axial grooves 32, expanded circumferential grooves 41, and expanded axial grooves 42. The circumferential groove 31 is located at the upper part of the outer circumferential surface 14b of the stator core 14 and at a middle portion in the axial direction. Instead, the circumferential groove 31 may be located at a position that is axially deviated from the middle portion. The circumferential groove 31 extends on the upper part of the stator core 14 along the outer circumferential surface 14b in the circumferential direction.

The axial grooves 32 are located at the upper part of the outer circumferential surface 14b of the stator core 14. Each axial groove 32 includes a first groove portion 32A and a second groove portion 32B. The first groove portion 32A includes a downstream end in the flow direction of the refrigerant R1. The downstream end opens in the first end face 14A. The first groove portion 32A extends from the downstream end toward the second end face 14B and is connected to the circumferential groove 31 at the upstream end of the first groove portion 32A in the flow direction. The downstream end of the first groove portion 32A is a first downstream end. The upstream end of the first groove portion 32A is a first upstream end.

Each second groove portion 32B includes a downstream end in the flow direction of the refrigerant R1. The downstream end opens in the second end face 14B. The second groove portion 32B extends from the downstream end toward the first end face 14A and is connected to the circumferential groove 31 at the upstream end of the second groove portion 32B in the flow direction. The downstream end of the second groove portion 32B is a second downstream end. The upstream end of the second groove portion 32B is a second upstream end.

The circumferential grooves 32, each including the corresponding first groove portion 32A and second groove portion 32B, are located on multiple (three in the present embodiment) positions that are separated from each other in the circumferential direction of the outer circumferential surface 14b. The axial grooves 32 extend in a direction that intersects the circumferential groove 31. In the present embodiment, the axial grooves 32 extend in a direction (axial direction) that is orthogonal to the circumferential groove 31, and are parallel to each other.

Figure 3A:
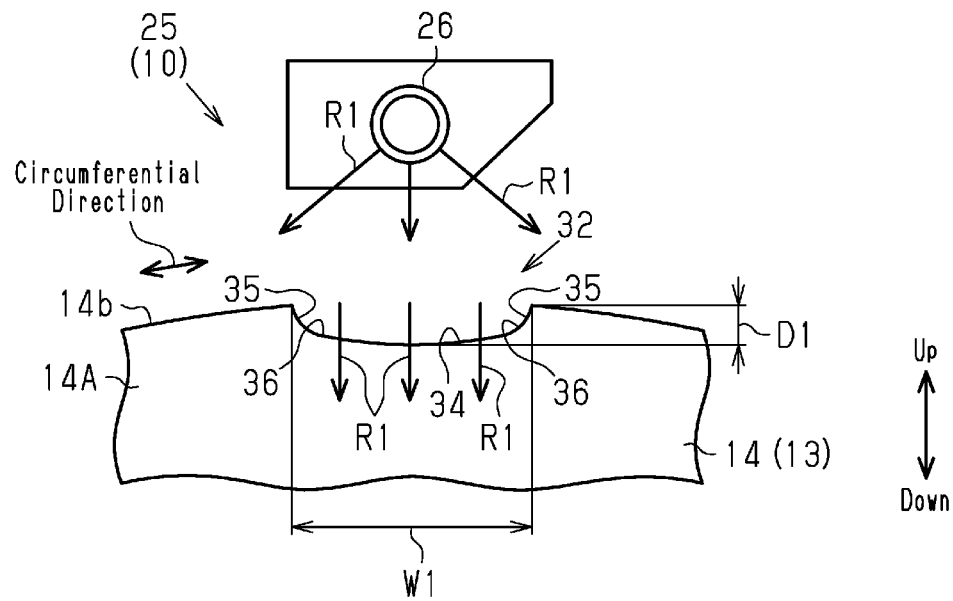
FIG. 3A is a partial side view of the axial groove and its surrounding portion in the embodiment.

As shown in FIG. 3A, the axial grooves 32 each include a bottom wall 34 and two opposing walls 35. The opposing walls 35 axially extend, facing each other in the circumferential direction of the stator core 14. The axial groove 32 is formed such that a groove width W1 is broader than a depth D1. The axial groove 32 includes curved boundaries 36, each located between the bottom wall 34 and the corresponding opposing wall 35. Instead, the axial groove 32 may include angular boundaries 36.

As shown in FIG. 2, one of the axial grooves 32 is located on the top of the stator core 14. The remaining two axial grooves 32 are located at positions that are lower than the position of the axial groove 32 at the top. Part of each axial groove 32 includes a small cross-sectional area portion X that is smaller than other portions of the axial groove 32. In the present embodiment, each small cross-sectional area portion X is located at an end 32a of the corresponding axial groove 32 on the downstream side.

The groove width W1 is narrower in each small cross-sectional area portion X than in the other portions of the corresponding axial groove 32. In the present embodiment, as the opposite ends 32a become farther from the circumferential groove 31 (i.e., as the opposite ends 32a become closer to the downstream end), the groove width W1 gradually becomes narrower. The end 32a located downstream of each axial groove 32 is a region including the downstream side of the axial groove 32. The end 32a is also referred to as an end region.

Thus, the two opposing walls 35 of each axial groove 32 are inclined with respect to the axis L1 at the end 32a so as to become closer to each other as the opposing walls 35 become farther from the circumferential groove 31. The two opposing walls 35 are inclined with respect to the axis L1 in opposite directions, each having the same angle (absolute value) inclined with respect to the axis L1. The depth D1 (see FIG. 3A) of each axial groove 32 remains the same at any position in the axial direction; that is, the depth D1 remains the same either at the ends 32a or at portions between the two ends 32a (hereinafter referred to as "intermediate portions 32b").

As shown in FIGS. 1 and 2, the two expanded circumferential grooves 41 respectively extend from the opposite ends of the circumferential groove 31 in the circumferential direction of the stator core 14, and each extend toward the upper surface 21a of the closest base 21. Each expanded axial groove 42 is formed in the flat upper surface 21a of the corresponding base 21. Each expanded axial groove 42 extends in a direction that intersects the corresponding expanded circumferential groove 41 (a direction that is orthogonal to the corresponding expanded circumferential groove 41 in the present embodiment), and is connected to the expanded circumferential groove 41. Each expanded axial groove 42 opens in opposite end faces of the corresponding base 21 in the axial direction. Each expanded axial groove 42 includes a bottom wall 44 and two opposing walls 45. The opposing walls 45 axially extend, facing each other in the circumferential direction. In the same manner as the axial grooves 32, the expanded axial grooves 42 each have a cross-sectional shape in which the groove width is broader than the depth. Instead, the cross-sectional shape of the expanded axial groove 42 may be different from that of the axial groove 32.

Each expanded axial groove 42 includes opposite ends 42a in the axial direction. The opposite ends 42a have a groove width W2 that becomes wider as the opposite ends 42a become axially farther from the expanded circumferential groove 41. Thus, the two opposing walls 45 of each expanded axial groove 42 are inclined with respect to the axis L1 at the end 42a such that the opposing walls 45 become farther from each other as the opposing walls 45 become farther from the circumferential groove 41. The two opposing walls 45 are inclined with respect to the axis L1 in opposite directions, each having the same angle (absolute value) inclined with respect to the axis L1. In the same manner as the axial grooves 32, the depth of each axial groove 42 remains the same at any position in the axial direction; that is, the depth remains the same either at the ends 42a or at portions between the two ends 42a (hereinafter referred to as "intermediate portions 42b").

The motor 10 of the present embodiment has the above structure. The operation of the present embodiment will now be described. The advantages resulting from the operation will also be described.

To cause the vehicle equipped with the motor 10 to travel, magnetic fields are generated by supplying current to the stator coil 15 so as to rotate the rotor 12 and by transmitting the rotation torque to the driving system of the vehicle. Thus, the supplying of current to the stator coil 15 generates Joule's heat, thereby heating the stator coil 15. The heat of the stator coil 15 is transferred to the stator core 14 so that the entire motor 10 including the stator 13 is heated.

In contrast, the present embodiment includes the cooling mechanism 25. Thus, the refrigerant R1 (cooling oil) accumulates at a lower part of the casing accommodating the motor 10. The refrigerant R1 is drawn up by a pump and carried to the shower pipe 26 through the refrigerant supplying passage. The refrigerant R1 jets out from the jet holes of the shower pipe 26 toward the lower side or toward the diagonally lower side. Part of the jetted the refrigerant R1 directly enters each axial groove 32. A different part of refrigerant R1 downwardly flows along the outer circumferential surface 14b and then enters each axial groove 32. The different part of the refrigerant R1 further enters the circumferential groove 31. This part of the refrigerant R1 downwardly flows along the circumferential groove 31. The circumferential groove 31 and the axial grooves 32 function as guiding passages for the refrigerant R1.

Figure 3B:
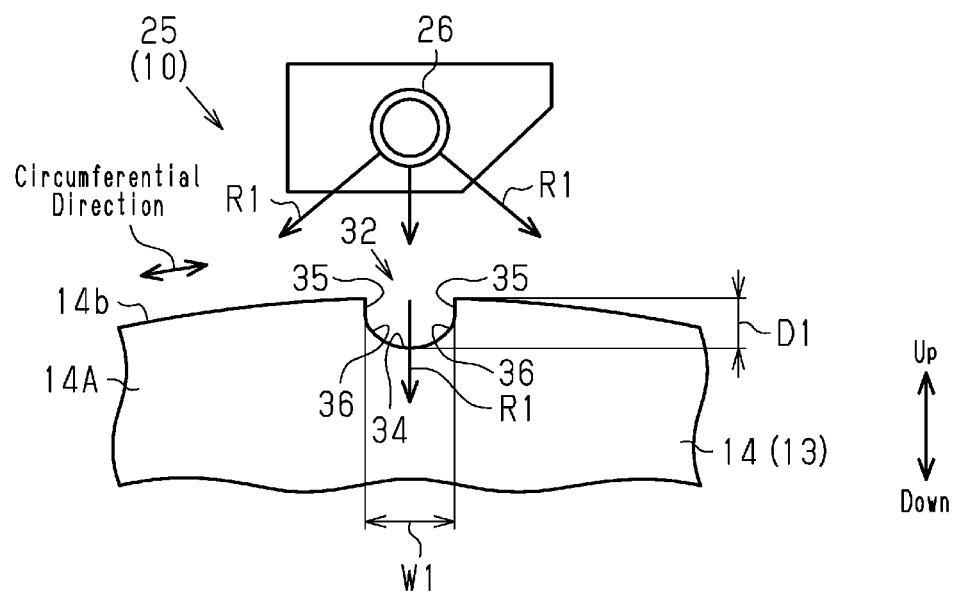
FIG. 3B is a partial side view of the axial groove and its surrounding portion in a comparative example.

As shown in FIG. 3B, if the groove width W1 is almost equal to the depth D1 and thus narrow in the intermediate portion 32b at each axial groove 32, a smaller amount of the refrigerant R1 jetted out of the shower pipe 26 would directly enter the axial groove 32. In this regard, in the present embodiment, as shown in FIG. 3A, the axial groove 32 is formed such that groove width W1 is broader than the depth D1. This allows a larger amount of the refrigerant R1 that directly enters the axial groove 32 than the amount in FIG. 3B.

However, an excessive increase in the groove width W1 of the axial groove 32 would lower the flow speed of the refrigerant R1. Accordingly, it is important to set the groove width W1 such that the refrigerant R1 easily enters the axial groove 32 and the flow speed remains unchanged.

If the boundary 36 between the bottom wall 34 and each opposing wall 35 in the axial groove 32 is angular (not shown), the refrigerant R1 would be stagnant at that portion. This would, for example, cause foreign matter or the like to accumulate or cause old refrigerant R1 to tend to remain. In this regard, in the present embodiment, as shown in FIG. 3A, the boundary 36 is curved in each axial groove 32. This limits accumulation of foreign matter at the boundary 36 and makes it less likely for the old refrigerant R1 to remain.

If the depth D1 of the axial groove 32 is excessively deep (not shown), a larger amount of the refrigerant R1 would need to be jetted out of the shower pipe 26. Further, it would be difficult to space the axial groove 32 and the stator coil 15 from each other by a necessary amount. In this regard, in the present embodiment, the depth D1 of each axial groove 32 is shallower than the groove width W1. This reduces the amount of the refrigerant R1 jetted out, and allows the axial groove 32 and the stator coil 15 to be easily spaced apart from each other.

As shown in FIG. 2, part of the refrigerant R1 flowing through the circumferential groove 31 flows into the axial grooves 32. In each axial groove 32, the refrigerant R1 flows toward the opposite ends 32a in the axial direction. Further, the refrigerant R1 that has been supplied to the axial grooves 32 without flowing through the circumferential groove 31 flows toward the opposite ends 32a. Accordingly, these refrigerants R1 cool the stator core 14.

In each axial groove 32, the groove width W1 of the opposite ends 32a is narrower than the groove width W1 of the intermediate portion 32b. However, as the opposite ends 32a become farther from the circumferential groove 31 (i.e., as the opposite ends 32a become closer to the downstream end), the groove width W1 gradually becomes narrower. Thus, as compared with when the groove width W1 suddenly decreases at the boundary between each end 32a and the intermediate portion 32b, the refrigerant R1 smoothly flows with a lower possibility of becoming stagnant at the two boundaries.

After passing through the opposite ends 32a, the refrigerant R1 downwardly flows out of the openings of the axial groove 32 in the first end face 14A and the second end face 14B. As a result, the refrigerant R1 cools the stator coil 15, including the coil ends 15a.

The refrigerant R1 downwardly flows out of the ends 32a of the axial grooves 32, which are located at multiple positions in the circumferential direction of the stator core 14. This allows the refrigerant R1 to be distributed to a wider range of the stator 13 in the circumferential direction. Thus, the refrigerant R1 cools the stator 13 and consequently cools the entire motor 10 in an even manner.

In each axial groove 32, the first groove portion 32A and the second groove portion 32B are both orthogonal to the circumferential groove 31. This allows the two coil ends 15a to be evenly heated by supplying the refrigerant R1 downward from the downstream ends of the first groove portion 32A and the second groove portion 32B.

The refrigerant R1 that has flowed downward from the coil ends 15a and the like accumulate at the lower part of the casing. The refrigerant R1 is drawn up by the pump and carried to the shower pipe 26 through the refrigerant supplying passage. In this manner, the refrigerant R1 is circulated.

As the opposite ends 32a of each axial groove 32 become farther from the circumferential groove 31 (i.e., as the opposite ends 32a become closer to the downstream end), the groove width W1 gradually becomes narrower. Thus, the opposite ends 32a are resistant to the flow of the refrigerant R1. As compared with when the groove width W1 remains constant at any position of each axial groove 32 in the axial direction, the refrigerant R1 is more likely to accumulate in the refrigerant passage 30. Thus, even if the supplying of the refrigerant R1 from the shower pipe 26 is stopped when, for example, the vehicle is stopped, the refrigerant R1 that accumulates in the refrigerant passage 30 is allowed to continue to flow downward in the above manner. This sufficiently cools the stator coil 15 and the stator core 14, and consequently cools the motor 10. As a result, the cooling performance is improved.

Additionally, in the present embodiment, the cooling mechanism 25 supplies the refrigerant R1 to the stator 13 by jetting the refrigerant R1 out of the shower pipe 26. Such a cooling mechanism 25 supplies a lower amount of the refrigerant R1 as the cooling mechanism 25 becomes farther from the shower pipe 26 in the circumferential direction of the stator core 14. In particular, it is difficult to supply a sufficient amount of the refrigerant R1 to the opposite ends of the stator 13 in the circumferential direction.

In this regard, in the present embodiment, the opposite ends of the stator core 14 in the circumferential direction each include the base 21 extending in the axial direction, and the upper surface 21a of the base 21 is flat. Further, the upper surface 21a of each base 21 includes the corresponding expanded axial groove 42. Each expanded axial groove 42 and the circumferential groove 31 are connected to each other by the corresponding expanded circumferential groove 41. Thus, the refrigerant R1 that has flowed to the bases 21 along the circumferential groove 31 and the expanded circumferential grooves 41, the refrigerant R1 that has reached the bases 21 after striking the rotating rotary shaft 11 and being dispersed, and the like are received by the upper surfaces 21a and enter the expanded axial grooves 42. In each expanded axial groove 42, the refrigerant R1 flows toward the opposite ends 42a in the axial direction. This refrigerant R1 cools the stator core 14. After passing through the opposite ends 42a, the refrigerant R1 downwardly flows out of the openings of the expanded axial grooves 42 on the end surfaces 21b of the bases 21. As a result, the refrigerant R1 cools the stator coil 15, including the coil ends 15a.

In each expanded axial groove 42, the groove width W2 are wider at the opposite ends 42a than at the intermediate portions 42b. This allows the refrigerant R1 to easily flow toward the opposite ends 42a in the expanded axial groove 42.

Furthermore, in the present embodiment, the groove width W2 of the opposite ends 42a gradually becomes broader as the opposite ends 42a become farther from the expanded circumferential groove 41. Thus, as compared with when the groove width W2 suddenly increases at the boundary between each end 42a and the intermediate portion 42b, the refrigerant R1 tends to flow smoothly with a lower possibility of becoming stagnant at the two boundaries.

Accordingly, even if a small amount of the refrigerant R1 is supplied to the opposite ends of the stator 13 in the circumferential direction, the opposite ends of the stator 13 are cooled by collecting the refrigerant R1 and causing the refrigerant R1 to flow down to the coil ends 15a. This allows the motor 10 to be cooled over a wider area and improves the cooling performance.

The above embodiment may be modified as follows. The above embodiment and the following modifications can be combined as long as the combined modifications remain technically consistent with each other.

Base 21

The upper surface 21a of each base 21 may be inclined so as to become higher as the upper surface 21a becomes farther from the corresponding expanded circumferential groove 41.

The two bases 21, the two expanded circumferential grooves 41, and the two expanded axial grooves 42 may be replaced with barriers. The barriers are protrusions that protrude radially outward from the outer circumferential surface 14b of the stator core 14 and extend axially. The barriers block the refrigerant R1 such that the refrigerant R1 is collected at the ends of the stator core 14 in the circumferential direction. Further, the barriers guide the refrigerant R1 collected in the above manner toward the opposite ends of the stator core 14 in the axial direction so that the refrigerant R1 downwardly flows out of the opposite ends, thereby cooling the stator coil 15.

Shower Pipe 26

The shower pipe 26 may be located at a position that is circumferentially offset from the top of the stator core 14.

Axial Groove 32

The axial grooves 32 may be located at positions in the circumferential direction that are different from those in the above embodiment.

The axial grooves 32 may be located at regular intervals in the circumferential direction or may be located at different intervals in the circumferential direction.

The axial grooves 32 may each have a different cross-sectional area. In this case, the cross-sectional area refers to at least one of the cross-sectional area of the intermediate portion 32b and the cross-sectional area of the end 32a.

For example, the axial grooves 32 may each have a different groove width W1 in FIG. 2.

For example, the groove width W1 may be narrowed in an axial groove 32 that is close to the shower pipe 26 (e.g., immediately below the shower pipe 26), and the groove width W1 may be widened in an axial groove 32 that is far from the shower pipe 26. This lowers the difference between the amount of the refrigerant R1 flowing through the axial groove 32 far from the shower pipe 26 and the amount of the refrigerant R1 flowing through the axial groove 32 close to the shower pipe 26. Thus, the amount of the refrigerant R1 downwardly flowing out of the ends 32a of the axial grooves 32 is prevented from varying depending on the distance from the shower pipe 26.

Alternatively, the groove width W1 may be widened in an axial groove 32 that is close to a position of the motor 10 where a large amount of heat is generated than in an axial groove 32 that is far from the position where a large amount of heat is generated. This allows a larger amount of the refrigerant R1 to flow down to the position where a large amount of heat is generated than to other portions, and thus allows for efficient cooling. Examples of the position where a large amount of heat is generated includes a position where the stator coil 15 is connected to another component.

Figure 4:
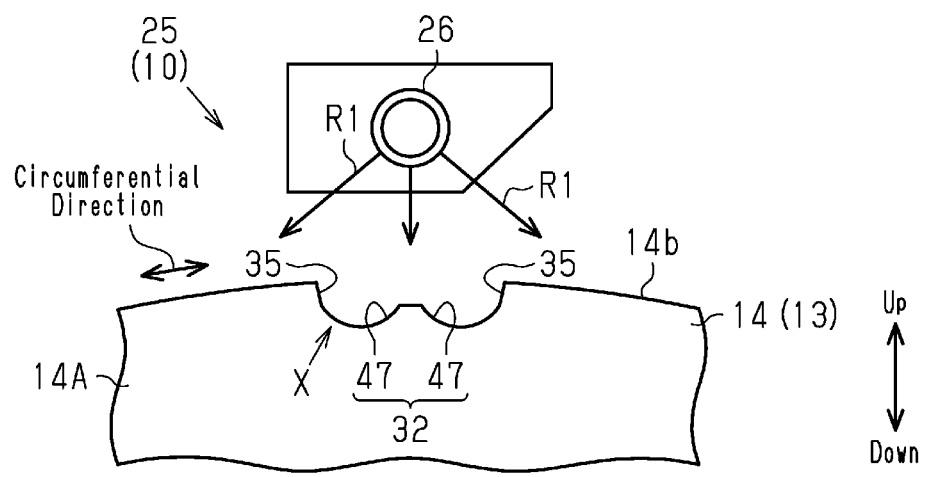
FIG. 4 is a partial side view of the axial groove and its surrounding portion in a modification.

As shown in FIG. 4, each axial groove 32 may include multiple (two in FIG. 4) grooves 47 that have a narrower groove width. This modification achieves the same operation and advantages as those of the embodiment.

In each small cross-sectional area portion X, the groove width W1 of the corresponding axial groove 32 does not have to be narrower than those of the other portions of the axial groove 32. Instead, the depth D1 of the axial groove 32 may be shallower than those of the other portions of the axial groove 32. The small cross-sectional area portion X may be arranged at the end 32a of each axial groove 32 on the downstream side in the flow direction of the refrigerant R1.

Figure 5:
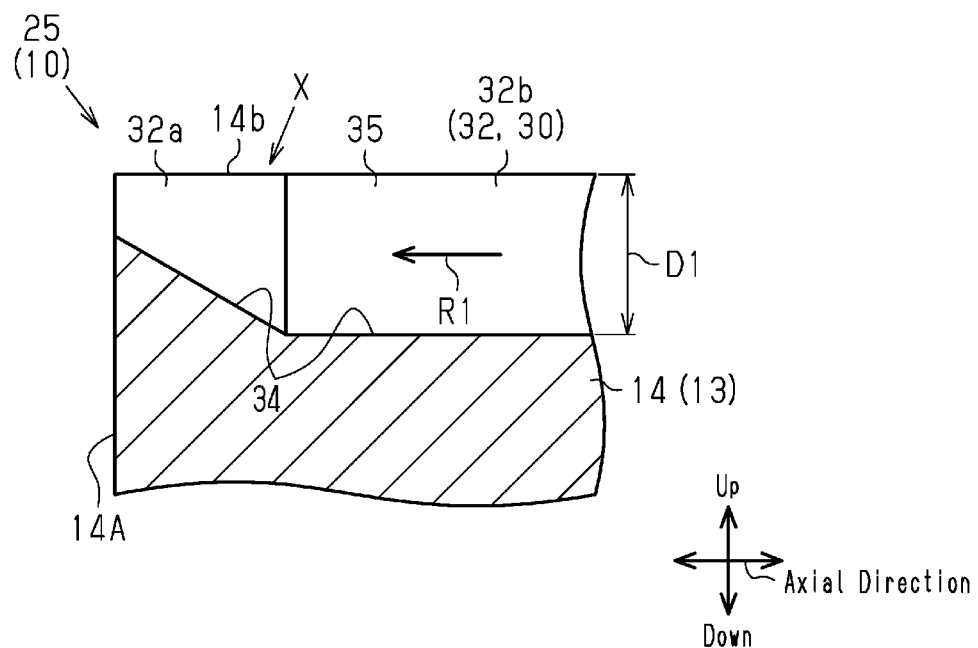
FIG. 5 is a partial cross-sectional view showing another modification in which the depth of the end of the axial groove becomes shallower as the end becomes farther from the circumferential groove.

As shown in FIG. 5, as the axial groove 32 becomes farther from the circumferential groove 31 (i.e., as the axial groove 32 becomes closer to the downstream end), the depth D1 may gradually become shallower. In this case, as the end 32a becomes farther from the circumferential groove 31 (i.e., as the end 32a becomes closer to the downstream end), the bottom wall 34 is inclined so as to become farther from the axis L1.

In the same manner as the embodiment, in which the groove width W1 becomes narrower, the end 32a of each axial groove 32 is resistant to the flow of the refrigerant R1. Thus, the refrigerant R1 tends to accumulate in the axial groove 32 and the circumferential groove 31. Thus, even if the supplying of the refrigerant R1 from the shower pipe 26 is stopped, the refrigerant R1 accumulated in the refrigerant passage 30 is used to cool the motor 10. This improves the cooling performance.

After the supplying of the refrigerant R1 from the shower pipe 26 is stopped by, for example, stopping the vehicle, surface tension causes some amount of the refrigerant R1 to remain at the end 32a of each axial groove 32. Thus, as compared with when no refrigerant R1 remains, the effect of cooling the stator core 14, the stator coil 15, and the like is expected to be higher.

Further, when the supplying of the refrigerant R1 from the shower pipe 26 is started by, for example, driving the vehicle, the refrigerant R1 is quickly distributed to the refrigerant passage 30. In this respect, the cooling effect is also expected to be higher.

A new refrigerant R1 may be subsequently supplied from the shower pipe 26. In such a case, at the end 32a of the axial groove 32, surface tension of the remaining refrigerant R1 limits the flow of the new refrigerant R1 beyond the end 32a immediately after the start of the supply. Accordingly, the refrigerant R1 easily flows to another portion of the refrigerant passage 30. This further improves the performance of storing the refrigerant R1 in the refrigerant passage 30.

The refrigerant R1 remaining in this manner is pushed out of the refrigerant passage 30 by the new refrigerant R1, which is subsequently supplied from the shower pipe 26. Thus, the old refrigerant R1 is replaced with the new refrigerant R1 without remaining in the refrigerant passage 30.

At the two ends 32a of each axial groove 32 on the downstream side, the groove width W1 becomes narrower as the axial groove 32 becomes farther from the circumferential groove 31. In addition, as shown in FIG. 5, the depth D1 may gradually become shallower as the axial groove 32 becomes farther from the circumferential groove 31.

In this modification, as compared with when only one of the groove width W1 and the depth D1 is reduced, the ends 32a of each axial groove 32 has more flow resistance to the refrigerant R1. Further, as compared with when one of the groove width W1 and the depth D1 of each end 32a is constant in the axial direction, the refrigerant R1 is more likely to accumulate in the refrigerant R1.

As compared with metal components of the motor 10, the temperature of the refrigerant R1 is less likely to increase. Thus, the entire refrigerant passage 30 is easily cooled merely by circulating a small amount of the refrigerant R1. Particularly, in the motor 10, the temperature of the stator coil 15 first increases, and the temperature of the stator core 14 then increases. Here, it is assumed that the vehicle travels with a travel pattern such that only the stator coil 15 becomes hot in a short period of time. In such a case, when, for example, the accelerator pedal is depressed in a short period of time, the accumulated refrigerant R1 does not suddenly become hot. Thus, even if the amount of the refrigerant R1 supplied from the shower pipe 26 is small, the refrigerant R1 overflows from the axial grooves 32 down to the coil ends 15a. In addition, the temperature of the refrigerant R1 accumulated in the axial grooves 32 is not so high. Accordingly, a sufficient cooling effect is obtained only by supplying and circulating a small amount of the refrigerant R1.

The number of the axial grooves 32 in the circumferential direction of the stator core 14 may be different from that in the embodiment.

At each end 32a of the axial groove 32, the angle (absolute value) formed by one opposing wall 35 with respect to the axis L1 may be different from the angle (absolute value) formed by the other opposing wall 35 with respect to the axis L1. In an extreme case, one opposing wall 35 may be parallel to the axis L1 and the other opposing wall 35 may be inclined with respect to the axis L1.

In either of these cases, at the opposite ends 32a of the axial groove 32, the groove width W1 becomes gradually narrower as the axial groove 32 becomes farther from the circumferential groove 31. This produces the same operation and advantages as those in the above embodiment.

The entirety of each axial groove 32 in the above embodiment, that is, the first groove portion 32A and the second groove portion 32B arranged on the same line may intersect the circumferential groove 31 at a non-orthogonal angle.

The first groove portion 32A and the second groove portion 32B of each axial groove 32 do not have to be located on the same straight line.

An example of the configuration in which the first groove portion 32A and the second groove portion 32B of each axial groove 32 are not located on the same straight line is as follows. The first groove portions 32A and the second groove portions 32B of the axial grooves 32, excluding the axial groove 32 located immediately below the shower pipe 26, may be inclined with respect to the axis L1 so as to become closer to the shower pipe 26 as the axial groove 32 becomes closer to the upstream end. In other words, the first groove portion 32A and the second groove portion 32B may extend downward from the upstream end, which is connected to the circumferential groove 31, toward the downstream end. This allows the refrigerant R1 to easily flow into the first groove portion 32A and the second groove portion 32B.

In this case, as long as the first groove portion 32A and the second groove portion 32B are located on the same position or on almost the same position in the circumferential direction, the two coil ends 15a are cooled evenly.

Another example of the configuration in which the first groove portion 32A and the second groove portion 32B of each axial groove 32 are not located on the same straight line is as follows. The first groove portions 32A and the second groove portions 32B of the axial grooves 32, excluding the axial groove 32 located immediately below the shower pipe 26, may be inclined with respect to the axis L1 so as to become closer to the shower pipe 26 as the axial groove 32 becomes farther from the upstream end. In other words, the first groove portion 32A and the second groove portion 32B may extend upward from the upstream end, which is connected to the circumferential groove 31, toward the downstream end. This allows the refrigerant R1 to be easily stored in the first groove portion 32A and the second groove portion 32B.

In this case, as long as the first groove portion 32A and the second groove portion 32B are located on the same position or on almost the same position in the circumferential direction, the two coil ends 15a are cooled evenly.

The first groove portion 32A and the second groove portion 32B may be circumferentially spaced apart from each other.

The small cross-sectional area portion X may be located at a portion that is different from the end 32a of the axial groove 32 on the downstream side.

The small cross-sectional area portion X may be formed such that its cross-sectional area becomes smaller toward the downstream end in a stepwise manner.

As shown in the embodiment and FIG. 5, the cross-sectional area of the small cross-sectional area portion X may gradually change. Instead, the cross-sectional area of the small cross-sectional area portion X may greatly change at a specific position.

Circumferential Groove 31 and Expanded Circumferential Groove 41

There may be multiple pairs of a circumferential groove 31 and two expanded circumferential grooves 41 in the axial direction.

One or both of the two expanded circumferential grooves 41 may be omitted. When the two expanded circumferential grooves 41 are omitted, the circumferential groove 31 may also be omitted.

The circumferential groove 31 may be orthogonal to a generatrix on the outer circumferential surface 14b of the stator core 14 as in the embodiment. Instead, the circumferential groove 31 may diagonally intersect the generatrix. Likewise, the expanded circumferential groove 41 may diagonally intersect the generatrix.

Expanded Axial Groove 42

The expanded axial grooves 42 may be arranged when the upper parts of the protrusions 17, 18 do not include the bases 21. In this case, each expanded axial groove 42 is located at a portion above the corresponding bolt hole 19.

Additionally, the expanded axial grooves 42 may be arranged when the portions above the bolt holes 19 on the upper surfaces of the protrusions 17, 18 are not flat (e.g., are curved).

The expanded axial grooves 42 may be arranged at multiple positions of the upper surface 21a of each base 21.

In the same manner as the modification of the axial groove 32 (see FIG. 4), each expanded axial groove 42 may include multiple grooves that have a narrow groove width.

Each expanded axial groove 42 may intersect the expanded circumferential groove 41 at a non-orthogonal angle.

At each end 42a of the expanded axial groove 42, the angle (absolute value) formed by one opposing wall 45 with respect to the axis L1 may be different from the angle (absolute value) formed by the other opposing wall 45 with respect to the axis L1. In an extreme case, one opposing wall 45 may be parallel to the axis L1 and the other opposing wall 45 may be inclined with respect to the axis L1.

In either of these cases, at the opposite ends 42a of the expanded axial groove 42, the groove width W2 gradually becomes narrower as the expanded axial groove 42 becomes farther from the expanded circumferential groove 41 in the axial direction. This produces the same operation and advantages as those in the above embodiment.

At the opposite ends 42a of the expanded axial groove 42, the opposing wall 45 may be formed such that the groove width W2 becomes larger toward the downstream side in a stepwise manner.

At the opposite ends 42a of the expanded axial groove 42, the groove width W2 may gradually change as shown in the embodiment and FIG. 5. Instead, the groove width W2 may greatly change at a specific position.

In the same manner as the modification of the axial groove 32 (see FIG. 5), the depths of the ends 42a of each expanded axial groove 42 may be set so as to become shallower as the expanded axial groove 42 becomes farther from the expanded circumferential groove 41. In this case, the degree to which the refrigerant R1 flows at each end 42a may be adjusted by adjusting the groove width W2 and the depth.

The invention claimed is:

1. A motor, comprising:
   a rotary shaft;
   a rotor that rotates with the rotary shaft;
   a stator core located around the rotor, the stator core including opposite end faces in an axial direction of the rotary shaft;
   a stator coil located on an inner circumferential portion of the stator core; and
   a shower pipe located above the stator core, the shower pipe supplying a liquid refrigerant to an upper part of an outer circumferential surface of the stator core, wherein
   the upper part of the outer circumferential surface of the stator core includes a circumferential groove and axial grooves,
   the circumferential groove extends in a circumferential direction of the stator core,
   the axial grooves are located at positions that are spaced apart from each other in the circumferential direction, and extend in a direction that intersects the circumferential groove, the axial grooves each open in the opposite end faces of the stator core, and each of the axial grooves includes opposite ends in the axial direction, the opposite ends having a groove width that becomes narrower as the opposite ends become farther from the circumferential groove.

2. A motor, comprising:

a rotary shaft;

a rotor that rotates with the rotary shaft;

a stator core located around the rotor;

a stator coil located on an inner circumferential portion of the stator core; and a shower pipe located above the stator core, the shower pipe supplying a liquid refrigerant to an upper part of an outer circumferential surface of the stator core, wherein the stator core includes a first end face and a second end face that are respectively located on opposite sides of the stator core in an axial direction of the rotary shaft, the upper part of the outer circumferential surface of the stator core includes an axial groove through which the refrigerant flows, the axial groove includes a downstream end in a flow direction of the refrigerant, the downstream end opening in at least one of the first end face and the second end face, and part of the axial groove includes a small cross-sectional area portion that has a smaller cross-sectional area than other portions of the axial groove.

3. The motor according to claim 2, wherein a groove width of the axial groove is narrower in the small cross-sectional area portion than in the other portions of the axial groove.

4. The motor according to claim 3, wherein the small cross-sectional area portion is located in an end region of the axial groove including the downstream end, and the groove width becomes narrower toward the downstream end.

5. The motor according to claim 2, wherein a depth of the axial groove is shallower in the small cross-sectional area portion than in the other portions of the axial groove.

6. The motor according to claim 5, wherein the small cross-sectional area portion is located in an end region of the axial groove including the downstream end, and the depth becomes shallower toward the downstream end.

7. The motor according to claim 2, wherein the axial groove includes a first groove portion and a second groove portion, the first groove portion includes a first downstream end opening in the first end face of the stator core and extends from the first downstream end toward the second end face, and the second groove portion includes a second downstream end opening in the second end face of the stator core and extends from the second downstream end toward the first end face.

8. The motor according to claim 7, wherein the upper part of the outer circumferential surface of the stator core includes a circumferential groove which extends in a circumferential direction of the stator core and through which the refrigerant flows, the first groove portion includes a first upstream end connected to the circumferential groove, and the second groove portion includes a second upstream end connected to the circumferential groove.

9. The motor according to claim 2, wherein the axial groove comprises a plurality of axial grooves that are located at positions that are spaced apart from each other in a circumferential direction of the stator core.

10. The motor according to claim 9, wherein the axial grooves include at least a first axial groove and a second axial groove located closer to the shower pipe than the first axial groove, and a cross-sectional area of the small cross-sectional area portion of the first axial groove is larger than a cross-sectional area of the small cross-sectional area portion of the second axial groove.

\* \* \* \* \*